United States Patent

[11] 3,590,769

| [72] | Inventor | Shaul Ladany<br>71 Reehov Aluf David, Ramat Gan, Israel |
|---|---|---|
| [21] | Appl. No. | 37,699 |
| [22] | Filed | May 15, 1970 |
| [45] | Patented | July 6, 1971 |

[54] COOKING VESSEL WITH ELAPSED TIME INDICATOR
6 Claims, 2 Drawing Figs.

[52] U.S. Cl. .................................................. 116/103, 99/344, 126/388
[51] Int. Cl. ...................................................... G08b 17/04
[50] Field of Search ............................................. 116/67, 70, 101, 102, 103, 114; 99/342, 343, 344; 126/373, 369, 388; 220/22

[56] References Cited
UNITED STATES PATENTS

| 83,264 | 10/1868 | Dimock | 99/344 |
| 1,944,365 | 1/1934 | Patchell et al. | 126/369 |
| 2,057,481 | 10/1936 | Ensign et al. | 126/388 |
| 2,716,376 | 8/1955 | Halsey | 99/344 |

FOREIGN PATENTS

| 560,818 | 10/1932 | Germany | 99/344 |

*Primary Examiner*—Louis J. Capozi
*Attorney*—Benjamin J. Barish

ABSTRACT: A cooking vessel for cooking an article, particularly an egg, and for providing a signal when a predetermined time of cooking has elapsed, comprises a container having a cooking compartment to contain the egg and water, and a signalling compartment to contain a larger quantity of water which is brought to a boiling point when a predetermined time has elapsed after the water in the cooking compartment begins to boil.

SHAUL LADANY
Inventor

By *[signature]*
Attorney

COOKING VESSEL WITH ELAPSED TIME INDICATOR

BACKGROUND OF THE INVENTION

1. Field of the invention

The present invention relates to cooking vessels, and particularly to vessels for cooking an article such as an egg, and for providing a signal when a predetermined time of cooking has elapsed.

2. Description of the Prior Art

It is frequently necessary or desirable to know when a predetermined time has elapsed after an article has been cooking, for example, how many minutes have elapsed after the water in which an egg is being cooked has begun to boil. Many timers have been devised for this purpose, but they are usually complicated and costly. In addition, the timer begins to measure the time as of the instant it is actuated, whereas in cooking eggs, for example, it is frequently desired to know the time as of the instant the water begins to boil.

SUMMARY OF THE PRESENT INVENTION

According to the present invention, there is provided a cooking vessel for cooking an article and for providing a signal when a predetermined time of cooking has elapsed, the cooking vessel comprising a container having two separate compartments in heat-insulating relationship with respect to each other. One of the compartments is a cooking compartment and is adapted to receive the article to be cooked, and a liquid to be brought to its boiling point during cooking. The other compartments a signalling compartment and includes a liquid which is brought to its boiling point when a predetermined time has elapsed after the liquid in the cooking compartment has been brought to its boiling point.

In the preferred embodiment of the invention, the article to be cooked is an egg, and the liquid in both compartments is water. The quantity of water in the signalling compartment is sufficiently greater than that in the cooking compartment so as to be brought to its boiling point when the predetermined time has elapsed after the water in the cooking compartment has been brought to its boiling point.

The preferred embodiment of the invention described below also includes an electrical heater attached to the bottom of the container in heat-exchange relationship with respect to both compartments.

The preferred embodiment further includes a cover for the vessel, the portion of the cover overlying the signalling compartment including an audible signal actuated when the liquid therein is brought to its boiling point.

Further features and advantages of the invention will be apparent from the description below.

BRIEF DESCRIPTION OF THE DRAWINGS

The invention is herein described, by way of example only, with reference to the accompanying drawings, wherein.

Figure 1:
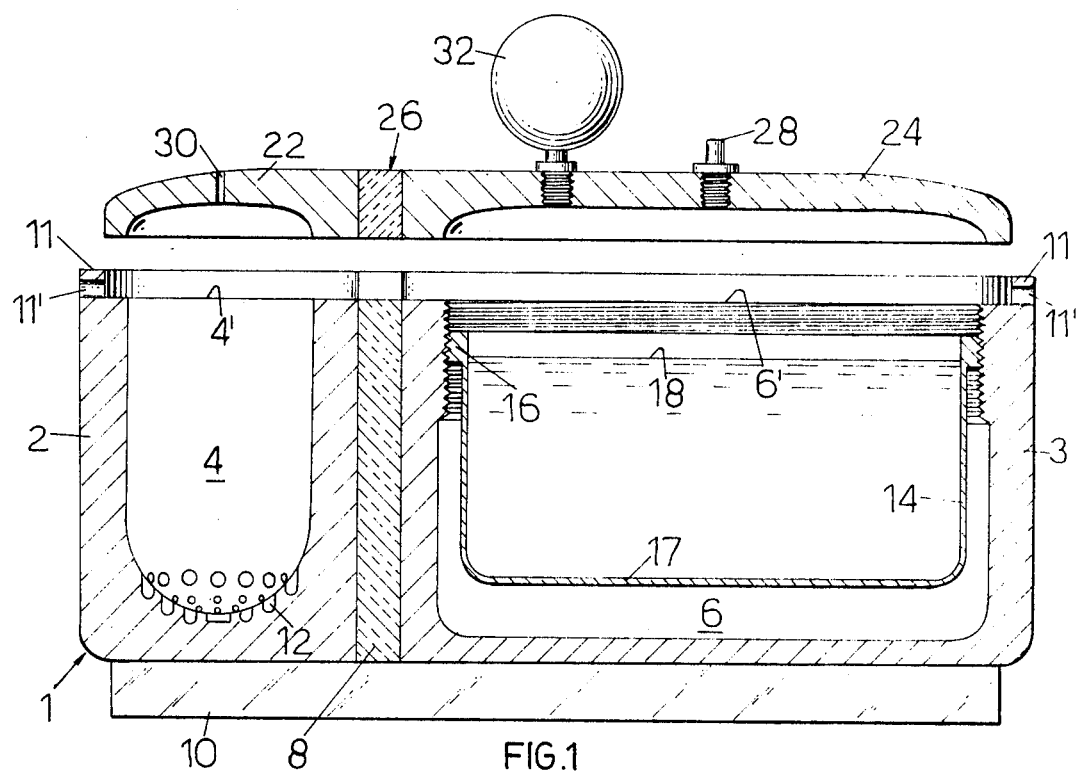
FIG. 1 is a longitudinal, sectional view of a cooking vessel for boiling eggs, which vessel is constructed in accordance with the present invention.
Figure 2:
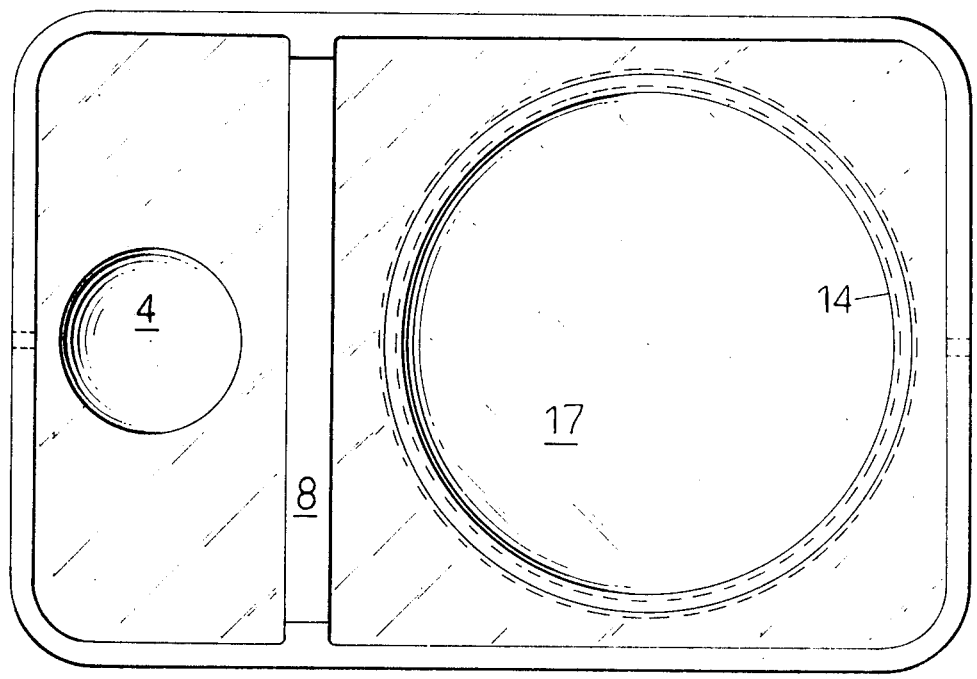
FIG. 2 is a top plan view, with the cover removed of the cooking vessel of FIG. 1.

The cooking vessel illustrated in the drawings, comprises a container, generally designated 1, made of two metal parts 2 and 3, each formed with a cavity defining two separate compartments 4 and 6 separated by a heat-insulating partition 8. The two parts may be joined to partition 8 by adhesive and/or fasteners (not shown). An electrical heater 10 is disposed at the bottom of the container in heat-exchange relationship to both compartments. The two compartments are bounded by a rim 11 formed at the top of container 1, the rim being provided with a plurality of drain openings 11.

Compartment 4 is the cooking compartment and is adapted to receive an egg together with a quantity of water in which the egg is to be cooked. The top edge of that compartment is delimited by edge 4' just below drain opening 11'. Compartment 6 is the signalling compartment and is of larger volume than cooking compartment 4, for receiving a larger quantity of water than in the latter compartment. Its top edge is delimited by edge 6' just below drain openings 11'.

Cooking compartment 4 is somewhat egg shaped at its bottom for receiving the egg, and is formed with a plurality of recesses 12 so as to increase the area of contact of the boiling water with the egg.

Signalling compartment 6 preferably contains a receptacle or cup 14 for the water, the cup being supported within the compartment by a threaded annular rim 16. The cup may be threaded more or less into compartment 6 so as to vary the position of its bottom well 17. This varies the volume of the compartment, as measured from its top edge 6', and thereby the predetermined elapsed time.

Cup 14 could be omitted, and the water introduced directly in contact with the walls of the compartment 6. The sidewalls of cup 14, or the walls of the compartments 6 itself if the cup is omitted, preferably carry markings 18 to indicate different quantities of water that may be introduced into the compartment; when cup 14 is used, the compartment 16 may carry markings for the different positions of the cup. These markings will therefore be indicative of different predetermined elapsed times.

A cover 20 is applied over the top of vessel 2, and seats on top edges 4' and 6' of the compartments, in contact with rim 11 so as to close off drains 11'. Cover 20 includes two parts, namely part 22 overlying compartment 4, and part 24 overlying compartment 6. Preferably, the two parts are separated by a heat-insulating partition 26 overlying partition 8. Part 24 carries an audible signal 28 in the form of a steam whistle which is actuated when the water in compartment 6 begins to boil. Part 22 overlying cooking compartment 4 may contain a vent 30. A hand knob 32 is fixed to the top of the cover.

The cooking vessel described is used in the following manner. First, the egg to be cooked is placed into compartment 4, and the latter compartment is then filled with water up to its top edge 4', the overflow draining through drain 11'. The predetermined elapsed time may be preset by threading cup 14 more or less in compartment 6, and/or by introducing the water to the appropriate marking 18 level. For example, the lowermost marking 18 may represent a desired elapsed time of 2 minutes; the next higher marking 18, an elapsed time of 3 minutes; and the highest marking 18 an elapsed time of 4 minutes. Cover 20 is then placed over the vessel, the heater 10 is energized.

Because of the smaller quantity of water in cooking compartment 4, the water is that compartment will first begin to boil. A predetermined time after, as determined by the quantity of water in compartment 6, the water in the latter compartment will begin to boil, and this will be signalled by the actuation of the audible signal 28. When that signal is actuated, the electrical heater may be deenergized and the egg within compartment 4 may be removed.

It will be appreciated that whereas only one cooking compartment has been illustrated, the cooking vessel could include two or more cooking compartments, for example several such cooking compartments for cooking several eggs at the same time. In addition, the electrical heater 10 may be omitted, and the cooking vessel may be heated by placing it over a gas flame.

Many other variations, modifications and applications of the illustrated embodiment will be apparent.

What I claim is:

1. A cooking vessel for cooking an article and for providing a signal when a predetermined time of cooking has elapsed, said cooking vessel comprising a container having two separate compartments in heat-insulating relationship with respect to each other, one of said compartments being a cooking compartment and adapted to receive the article to be cooked and a liquid to be brought to its boiling point during cooking, the other of said compartment being a signalling compartment and including a liquid which is brought to its boiling point when a predetermined time has elapsed after said liquid in the cooking compartments has been brought to its boiling point.

2. A cooking vessel as defined in claim 1, constructed particularly for use wherein the article to be cooked is an egg and the liquid in both compartments is water, the volume of said signalling compartment being such that the quantity of water therein is sufficiently greater than that in the cooking compartment so as to be brought to its boiling point when said predetermined time has elapsed after the liquid in the cooking compartment has been brought to its boiling point.

3. A cooking vessel as defined in claim 1, further including an electrical heater attached to the bottom of said container in heat-exchange relationship with respect to both of said compartments.

4. A cooking vessel as defined in claim 1, further including a cover therefor, the portion of said cover overlying said signalling compartment including an audible signal actuated when the liquid therein is brought to its boiling point.

5. A cooking vessel as defined in claim 1, wherein said signalling compartment contains a receptacle threadedly supported therein, the position of the bottom of said receptacle being variable to vary the volume thereof and thereby the said predetermined elapsed time.

6. A cooking vessel as defined in claim 1, wherein said signalling compartment contains markings in accordance with different quantities of liquid to be included therein for indicating different elapsed times.